United States Patent [19]
Ananthan et al.

[11] Patent Number: 5,634,138
[45] Date of Patent: May 27, 1997

[54] BURST BROADCASTING ON A PERIPHERAL COMPONENT INTERCONNECT BUS

[75] Inventors: Manickam Ananthan, Irvine; Vi Chau, Laguna Niguel, both of Calif.

[73] Assignee: Emulex Corporation, Costa Mesa, Calif.

[21] Appl. No.: 488,035

[22] Filed: Jun. 7, 1995

[51] Int. Cl.⁶ .......................... G06F 13/00; G06F 13/28; G06F 13/38
[52] U.S. Cl. .......................... 395/841; 395/280; 395/855
[58] Field of Search .......................... 395/841, 468, 395/287, 827, 821, 439, 200.06, 200.07, 200.03, 849, 280, 851–853, 855, 408

[56] References Cited

U.S. PATENT DOCUMENTS

| | | | |
|---|---|---|---|
| 4,494,192 | 1/1985 | Lew et al. | 395/292 |
| 4,574,350 | 3/1986 | Starr | 395/726 |
| 4,998,198 | 3/1991 | Chan | 395/852 |
| 5,050,072 | 9/1991 | Earnshaw et al. | 395/288 |
| 5,175,825 | 12/1992 | Starr | 395/200.07 |
| 5,179,663 | 1/1993 | Iimura | 395/250 |
| 5,386,540 | 1/1995 | Young et al. | 395/471 |
| 5,524,215 | 6/1996 | Gay | 395/287 |
| 5,528,764 | 6/1996 | Heil | 395/293 |

*Primary Examiner*—Gopal C. Ray
*Attorney, Agent, or Firm*—Fish & Richardson P.C.

[57] ABSTRACT

A system and method for burst broadcasting data from a master device to multiple target devices over a peripheral component interconnect (PCI) bus. Initially, an initiator device in the system captures control of the bus. The initiator device inspects an internal coherency flag. The initiator device releases the bus if its coherency flag is set (if the initiator device is not in the middle of a previously commenced burst broadcast, in which case it keeps control of the bus). The initiator device then sets the coherency flag in each of the other devices, and concurrently sets it own coherency flag. Once all the coherency flags are set, the initiator device broadcasts a block of data on the bus to each of the other devices simultaneously. Once the burst-broadcast is complete, the coherency flags in the initiator device and each of the other devices are concurrently reset by the initiator device. The invention augments an existing bus technology by adding a new mode of operation.

10 Claims, 5 Drawing Sheets

BURST BROADCASTING ON A PERIPHERAL COMPONENT INTERCONNECT BUS

BACKGROUND OF THE INVENTION

1. Field of the Invention

This invention relates to electronic systems for transferring data over a bus, and particularly to a system and method for burst broadcasting data from a single bus interface unit (BIU) to multiple other BIUs over a peripheral component interconnect (PCI) bus.

2. Description of Related Art

In current computer systems, it is necessary to transfer large amounts of data quickly between different peripheral devices, such as video graphics cards (30 Mbytes/sec), network interfaces (15 Mbytes/sec), and magnetic or optical disk drives (20 Mbytes/sec). The common high-speed electronic path that these peripheral devices share in exchanging data is called an input/output (I/O) bus, and the connections between the peripheral devices and the bus are called bus interface units (BIUs). When discussing data transfers, this specification refers to the peripheral devices and their associated BIUs interchangeably.

In many computer systems, the I/O bus often acts as a bottleneck, limiting the rate of data transfer. One relatively new I/O bus (released in 1992), designed with a high bandwidth (132 Mbytes/sec or more), is the peripheral component interconnect (PCI) bus. The PCI bus is described by *PCI Local Bus Specification*, revision 2.0, PCI Special Interest Group, Apr. 30, 1993, the entirety of which is incorporated herein by reference.

While it has significant advantages, one problem with the PCI bus is that it does not provide for burst-broadcasting data. "Broadcasting" means the simultaneous transfer of data from a single BIU to multiple other BIUs on the PCI bus. "Burst" means that the transfer can extend over multiple data phases, rather than being a single data phase. Although the PCI bus provides for a PCI Special Cycle in which a message can be broadcast to multiple devices, the PCI Special Cycle message can only be a single data phase. Consequently, it has not been possible to broadcast blocks of data to multiple devices concurrently. For example, if a network is to become unavailable for a period of time due to repairs, multiple messages must be sent to all other peer devices before the repair occurs. If the messages are lengthy, a significant amount of time may be required to sequentially access and communicate with each device.

In view of the foregoing, it is an object of the present invention to provide a data management system capable of burst-broadcasting data from a single peripheral device to multiple other peripheral devices.

It is another object of the invention to provide a data management system which can burst data both sequentially (one peripheral device at a time) and simultaneously (all peripherals devices at once).

It is another object of the invention to use the industry standard PCI bus protocol as a backbone for burst-broadcast data transfers.

SUMMARY OF THE INVENTION

The present invention is used in a computer system with multiple devices connected to a PCI bus. Initially, an initiator device in the system captures control of the bus. The initiator device inspects an internal coherency flag. The initiator device releases the bus if its coherency flag is set (if the initiator device is not in the middle of a previously commenced burst broadcast, in which case it keeps control of the bus). The initiator device then sets the coherency flag in each of the other devices, and concurrently sets it own coherency flag. Once all the coherency flags are set, the initiator device broadcasts a block of data on the bus to each of the other devices simultaneously. Once the burst-broadcast is complete, the coherency flags in the initiator device and each of the other devices are concurrently reset by the initiator device.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
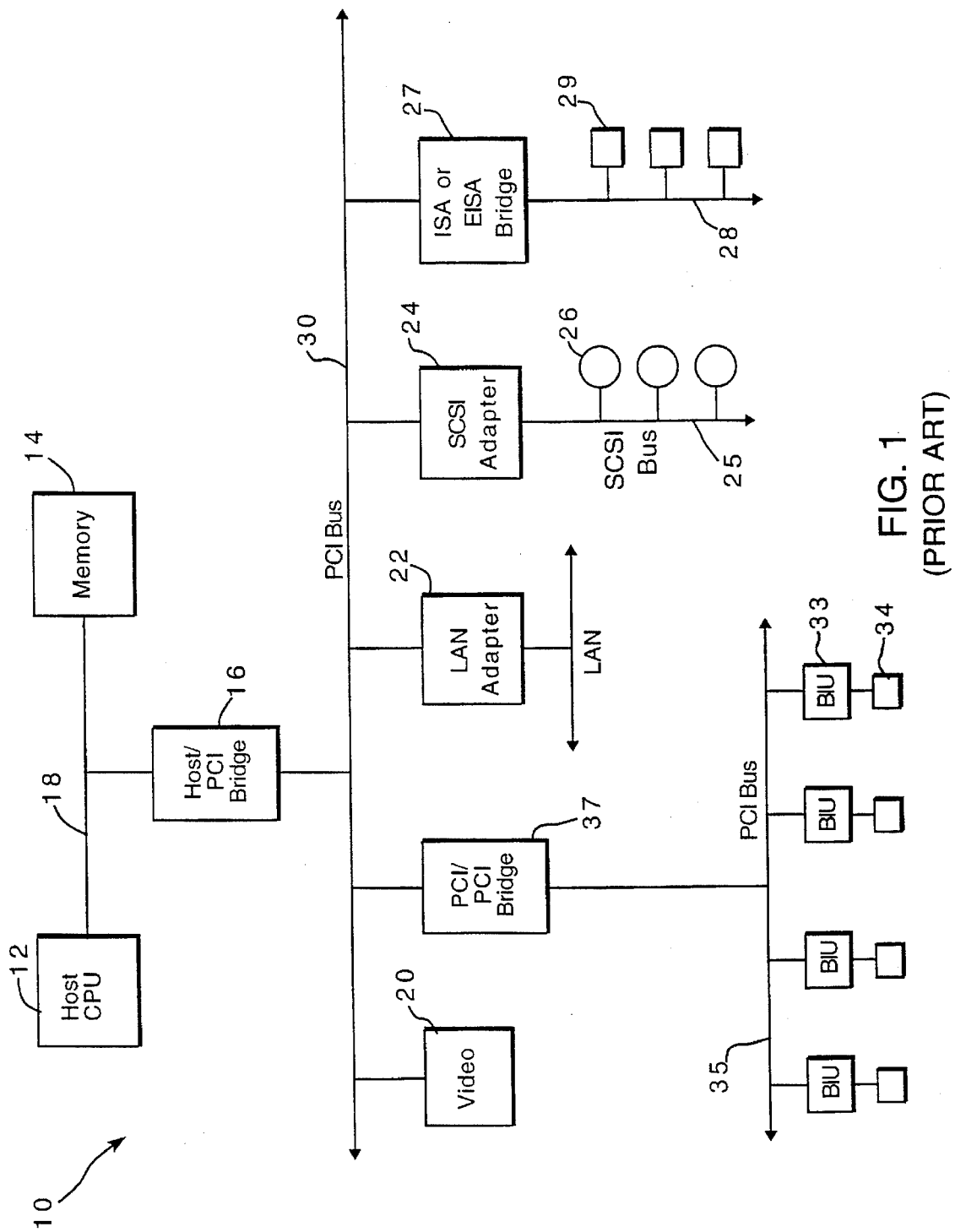
FIG. 1 is a block diagram of a computer system including peripherals connected by various bus tiers.

A typical prior computer system 10, shown in FIG. 1, includes a host central processing unit (CPU) 12, a main memory 14, and a host/PCI bridge 16 interconnected by a memory bus 18. Various peripheral devices, such as a video graphics card 20, a local area network (LAN) adapter 22, a SCSI adapter 24, and an EISA bridge 27 may be interconnected through a conventional peripheral component interconnect (PCI) bus 30.

In the example shown, the SCSI adapter 26 is connected through SCSI bus 25 to storage devices 26, such as magnetic or optical disk drives or tapes. The EISA bridge 27 is connected through an EISA bus 28 to other peripheral devices 29, such as I/O devices or additional memory. The LAN adapter 22 is coupled to a LAN, such as an Ethernet or Token Ring network.

The computer system 10 can include PCI busses arranged in a hierarchy. Each branch in the hierarchy may be called a "tier", and the peripheral devices connected to the same tier are "peers". For example, peer devices 34 may be connected by bus interface units (BIUs) 33 to second tier PCI bus 35. The second tier PCI bus 35 may be connected to the first tier PCI bus 30 by a PCI/PCI bridge 37.

In a transfer of data (also called a "transaction") across a commonly used bus, a source device drives data onto the bus, while one or more destination devices load data from the bus. In a conventional PCI system, each transaction involves two types of devices. The device that initiates a transaction (whether as source or destination) is called the initiator, or bus master. The device that is currently accessed by the initiator is called the target, or slave. Transactions in which the master BIU transfers data to the target BIU are called write transactions. Transactions in which the target BIU transfers data to the master BIU are called read transactions.

Figure 2:
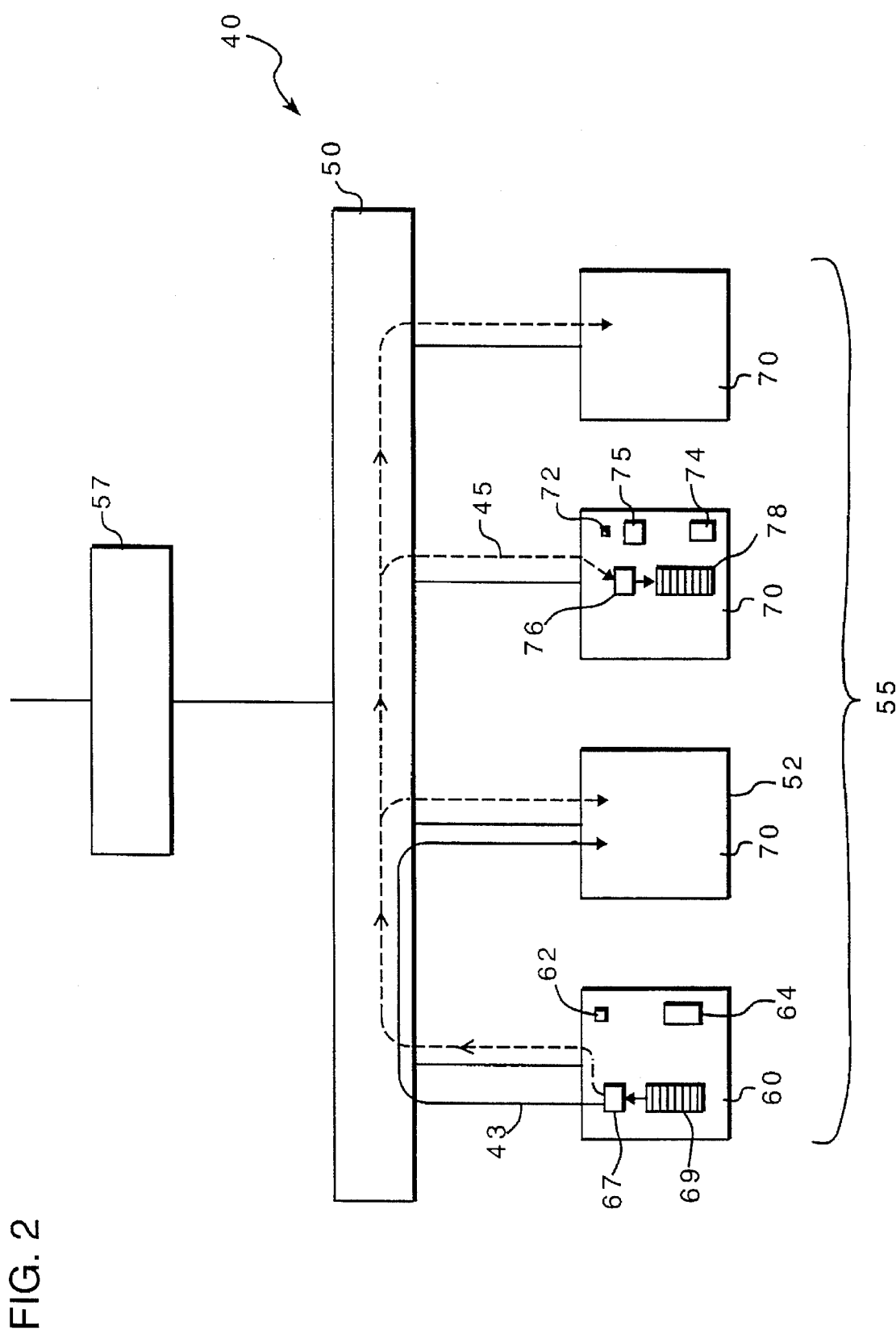
FIG. 2 is a block diagram of a PCI bus tier.

In FIG. 2, a PCI bus tier 40 designed according to the invention includes a PCI bus 50 and multiple BIUs 55 (tier 40 may include more BIUs 5 than the four illustrated in FIG. 2; the PCI standard allows the connection of up to 255 BIUs to each PCI bus). The PCI bus 50 may be connected to another PCI bus, or to the host, by a bridge 57. The PCI bus 50 and the bridge 57 may be constructed as known in the art. In the preferred embodiment, tier 40 is the bottommost tier of a computer system 10. However, the principles of the invention can be applied at any other tier of the computer system 10.

In a standard PCI write transaction, only one peripheral device loads data from PCI bus 50. For example, in the write transaction indicated by solid line 43, a master BIU 60 would transfer data to the PCI bus 50, and only one target BIU 52 would load that data from the PCI bus 50. Since only one peripheral device would receive the data, such transactions are called device-to-device transactions.

However, in the system according to the invention, BIUs 55 are capable of two types of write transactions: traditional device-to-device transactions, and burst-broadcast transactions. In the burst-broadcast write transaction of the invention, shown by dashed line 45, a master BIU 60 transfers data to the PCI bus 50, and multiple other target BIUs 70 in the tier 40 load the data from the PCI bus 50.

Preferably, the BIUs 55 are identical, except that each is mapped to a different address. The BIUs 55 are constructed in the same manner as sample BIU 80 shown in FIG. 3. Each BIU 80 acts as an interface between the PCI bus 50 and a peripheral device 90. Each BIU 80 has a semaphore coherency flag 82, which may be a memory register or a bit in a register. The flag 82 can be read by control state machine 84, and set or reset by a conventional PCI Special Cycle. The flag 82 can be set by any BIU 55 in tier 40 that attains bus master status. However, once a flag 82 is set, only the BIU which set that flag 82 can reset it.

The coherency flag 82 of each BIU 80 may be considered to be an instance of the same flag. That is, the flags 82 are intended to be set and reset as a group (minor timing delays aside), and represent part of a single control system for implementing a burst broadcast.

A control state machine 84 controls the operations of each BIU 80 by sensing input signals and controlling output signals according to preprogrammed instructions. The state machine 84 contains routines so that the BIU 80 can function as either a master BIU or a target BIU. The state machine 84 is preferably implemented in hardware for speed, but may be implemented with a combination of hardware and software. A decoder 85 can access a write register 86 and provide information about the contents of the write register 86 to the state machine 84. The BIU 80 also contains a write buffer 86, a read buffer 87, a write first-in-first-out (FIFO) storage unit 88, and a read FIFO storage unit 89. The buffers and FIFO units are conventional and may be implemented by practices known in the art.

Figure 4:
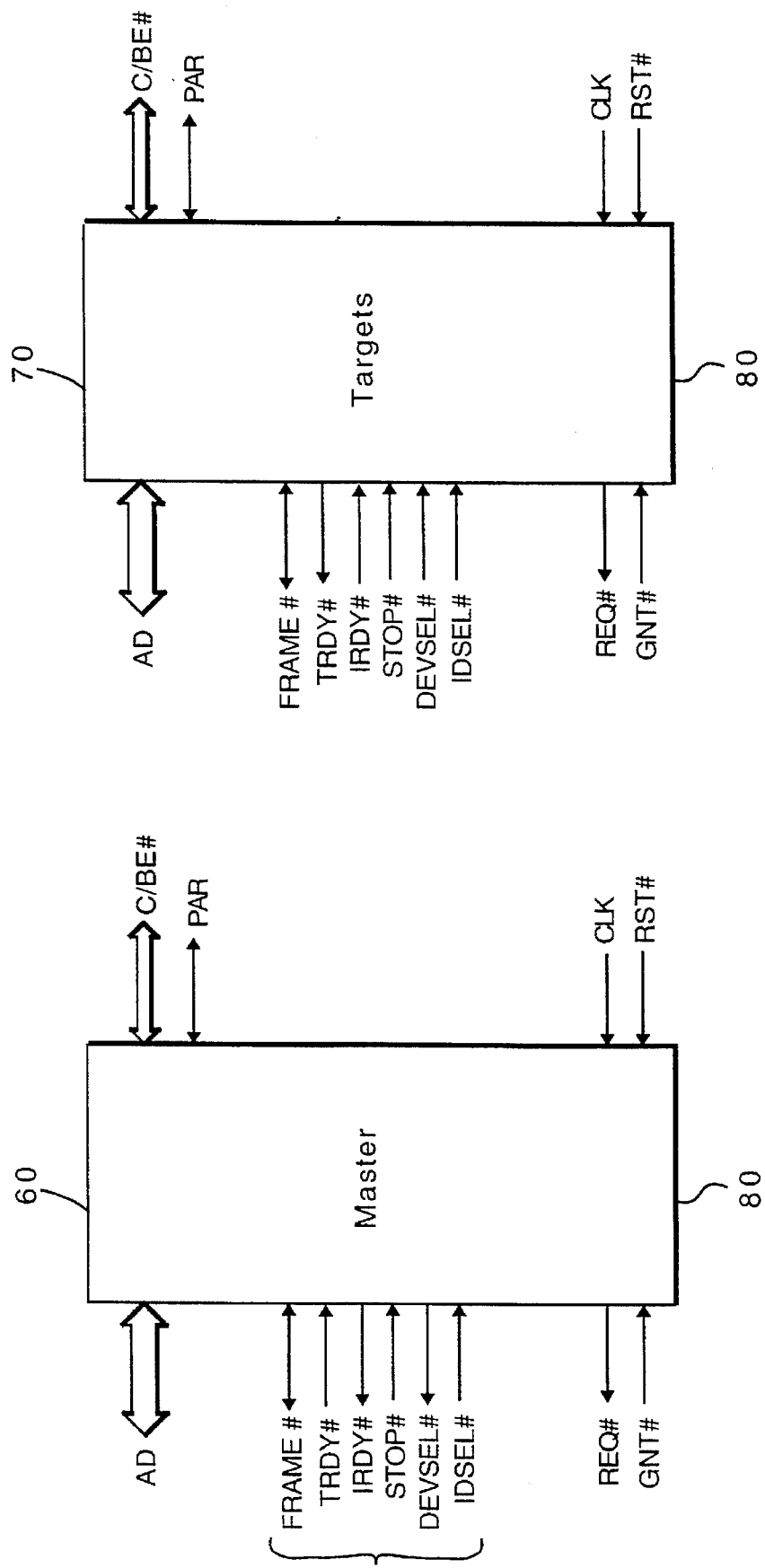
FIG. 4 is a block diagram showing the signals used by an initiator and a target BIU in accordance with the preferred embodiment of the present invention.

FIG. 4 shows the signals utilized by a BIU 80, either as a master 60 or as a target 70, during a burst-broadcast transaction 45. System signals CLK and RST# and arbitration signals REQ# and GNT# each provide functions well understood in PCI systems, and will be described only briefly. The clock signal CLK is input to all BIUs 55 on PCI bus 50, and provides timing for all transactions. A reset signal RST# may be input to a BIU 80 to reset its state machines 84 and registers 86 and 87. It should be noted that the RST# signal will also initialize the internal coherency flag 82. For arbitration, a BIU 80 can send a request signal REQ# to a PCI arbiter (not shown) to become the bus master. The PCI arbiter will select one BIU 80 as bus master, and will send a grant signal GNT# to that BIU 80.

Control interface signals, including frame signal FRAME#, target ready signal TRDY#, initiator ready signal IRDY#, stop signal STOP#, device select signal DEVSEL#, and initialization device select signal IDSEL, are used in a fashion known to those in the art during traditional device-to-device transactions. However, these signals will function differently, as described below, in a burst-broadcast transaction in accordance with the present invention. In particular, the master 60, rather than a target 70, may drive the DEVSEL# signal.

The basic format of a PCI bus transaction is an address phase followed by one or more data phases. In the address phase, a master 60 identifies a target 70 and the type of transaction (e.g., read or write). Then, during each data phase, one BIU (the master 60 in a write transaction, the target 70 in a read transaction) outputs data onto the PCI bus which is loaded by the other BIU. During the address phase, an address/data bus AD carries address information, while a command/byte-enable bus C/BE carries a code to define the type of transaction (e.g., read or write). During the data phase, the AD and C/BE busses are driven by the master 60 (in a write transaction) or by the target 70 (during a read transaction). The AD bus carries multiple bytes of data from the source device, and the C/BE bus indicates which bytes in the AD bus should be loaded by the destination device.

Together, the AD and C/BE busses and control status lines, which are commonly accessible to each BIU 55, form the PCI bus 50. When a BIU 80 "drives" the commonly accessible busses or lines, its output can be sensed by the other BIUs.

Each BIU 80 may have connections for other signals, such as error reporting signals, interrupt request signals, locking signals, 64-bit extension signals, boundary-scan signals, and sideband signals. However, as these signals are not pertinent to the invention, they will not be discussed further.

Figure 3:
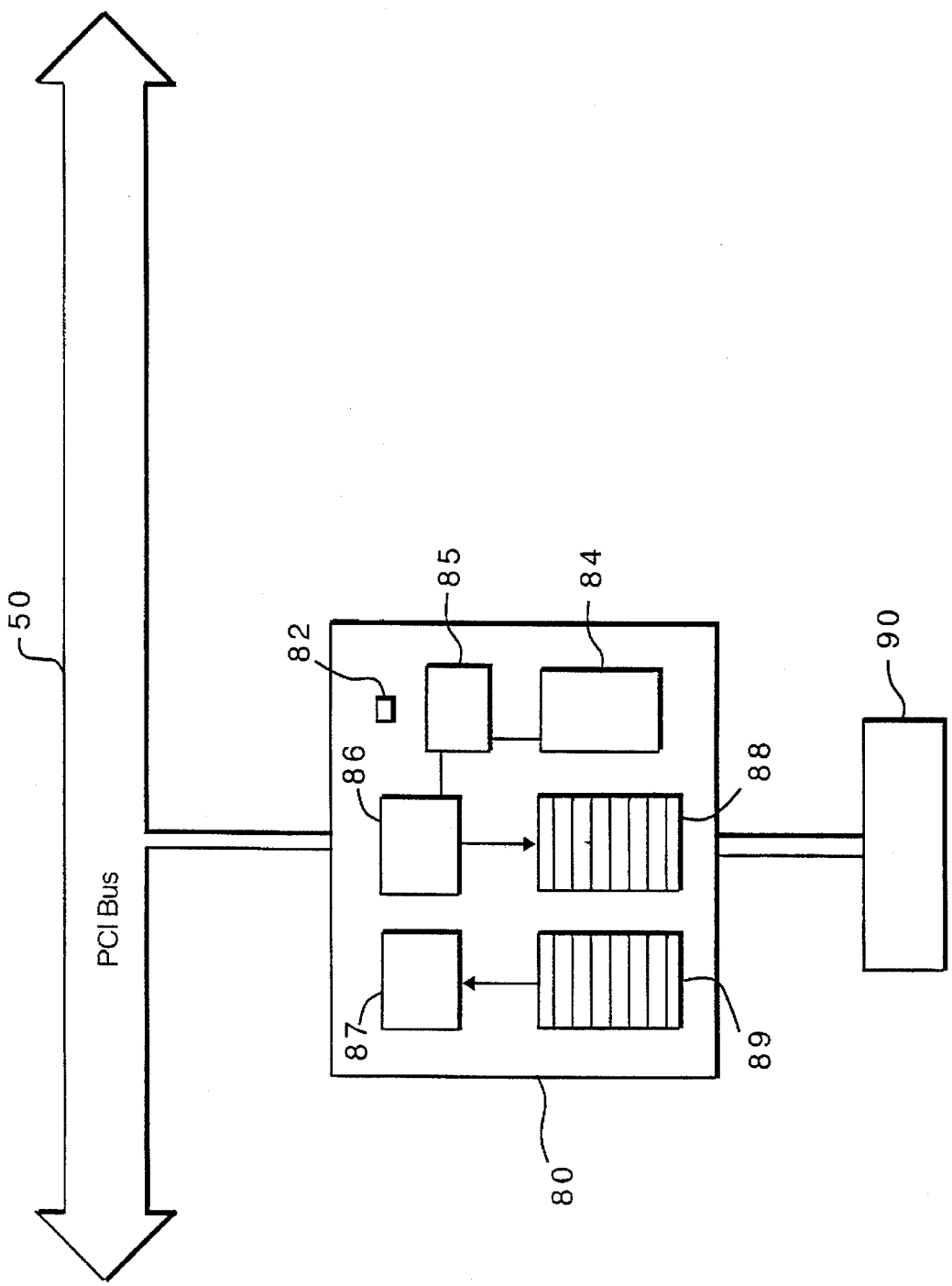
FIG. 3 is a block diagram of a bus interface unit according to the invention.

Referring to FIGS. 2, 3 and 4, the burst-broadcast sequence may be summarized as a sequence of actions by the master 60 and reactions by the targets 70. First, the master 60 arbitrates for and captures control of the PCI bus 50. Once the master 60 has captured control of the PCI bus 50, the master 60 inspects its own flag 62. If the flag 62 is already set, and the master 60 is not in progress with a previously commenced burst-broadcast sequence, this indicates that a burst broadcast sequence was already in progress by another BIU 80. Accordingly, the master 60 abandons control of the PCI bus 50 and discontinues the sequence. If the master 60 was in progress with a previously commenced burst-broadcast sequence, the master 60 continues that sequence, as described below.

Otherwise, the master 60 executes a PCI Special Cycle to set the flag 72 in each target 70, and concurrently the master 60 sets its own flag 62. In this context, "concurrently" means "around the same time", since the master flag 62 can be set somewhat before, simultaneously with, or somewhat after the target flags 72 are set. The master 60 may set its own flag 62 by responding to the PCI Special Cycle (since the master 60 "listens" to traffic on the bus), or directly by means of other internal circuitry.

Thereafter, each target 70 enters a special burst-broadcast compliant state, and the master 60 can commence burst-broadcasting. Once the master 60 has completed the burst-broadcast, the master 60 executes another PCI Special Cycle to reset the coherency flags of the targets 70 and concurrently resets its own flag. If any BIU 80 with a set coherency flag 82 is accessed for a transaction (which could occur if the master 60 loses control of the PCI bus 50 between setting and resetting its own coherency flag 62), then that BIU 80 will issue retry messages in response to any write-type commands or multi-data phase read-type commands until it recaptures control of the PCI bus 50. Once the coherency flags are reset, the burst-broadcast sequence is complete.

The master 60 arbitrates and captures the PCI bus 50 in a manner known to those in the art. In brief, any BIU 80 which desires to perform a data transfer, whether read or write, device-to-device or broadcast, asserts its request signal REQ# to inform a bus arbiter (not shown) that the BIU 80 has a pending transaction. The bus arbiter grants control of the PCI bus 50 to a particular BIU 80 by asserting a grant signal GNT# for that BIU. Once a BIU 80 senses a GNT# signal, an internal state machine 64 causes that BIU 80 to act as the master 60. No more than one GNT# line is activated at one time. The particular scheme used by the bus arbiter to determine which request to grant may be defined on a system by system basis, and may be based on priority, rotation, first-in-first-out, or some combination.

Once the bus arbiter asserts the GNT# signal for the master 60, if the master 60 has a burst-broadcast transaction to perform, then its state machine 64 inspects its semaphore flag 62. If the master 60 is not in progress with a previously commenced burst-broadcast sequence (in which case it continues that sequence), and its flag 62 is already set, then the state machine 64 knows that another BIU 80 has already requested a burst-broadcast transaction. Therefore, the master 60 relinquishes control of the PCI bus 50 by deasserting its REQ# signal, and does not proceed further in the burst-broadcast sequence. The master 60 may attempt to recapture the PCI bus 50 at a later time.

Assuming that the flag 62 is not set, then the state machine 64 of the master 60 executes a PCI Special Cycle to set the flags 72 in the targets 70. The PCI Special Cycle of the present invention generally conforms to the PCI Special Cycle known in the art. As known in the art, a PCI Special Cycle by a master 60 is a specialized broadcast of a single data phase, called a message, to multiple targets on the PCI bus 50. Specifically, the during the address phase, the master 60 places the PCI Special Cycle command (binary "0001" in the PCI standard) on the C/BE bus. Each target 70 senses the presence of the PCI Special Cycle command, and prepares to load the PCI Special Cycle command message during the following data phase. During the data phase of the Special Cycle, the master 60 places a message onto the A/D bus, and decoders 75 in each target 70 decode the message.

During an initial PCI Special Cycle in accordance with the present invention, the master 60 outputs a message that informs state machines 74 in each target 70 that a burst-broadcast is about to commence. For example, in the preferred embodiment, messages concerning burst-broadcast might use the code "0003" (hex) in the lower half of the A/D bus. An instruction to set the flag 72 in each target 70 could be indicated by the code "000F" (hex) in the upper half of the A/D bus. Each target 70 receives the PCI Special Cycle message, decodes the instruction with its decoder 75, and set its flag 72. The primary requirement for the message is that the codes cannot already have been assigned in the PCI specification.

The master 60 can use a variety of different instructions in a message to indicate different broadcast conditions. For example, there might be one instruction to broadcast to all memory devices, another instruction to broadcast to graphics processors, etc. Only those BIUs 80 to which the instruction applies would use the data during the following burst-broadcast phase. However, all BIUs 80 would still set their flags 72 to prevent conflicts.

Because of the need to set all of the flags 72 in the targets 70 before a burst broadcast can transmit data, it is recommended (but not necessary) that an external bus-tier arbiter not take control of the PCI bus 50 away from the master 60 between completion of the PCI Special Cycle and the commencement of a burst-broadcast transaction.

Once the target flags 72 are set, the state-machines 74 in the targets 70 depart from their normal PCI-compliant behavior and begin operating under a special burst-broadcast behavior pattern. In the burst-broadcast compliant state, each target 70 loads data from the PCI bus on each write transaction, even if the write transaction is not specifically addressed to that target. In addition, the targets 70 will not assert the DEVSEL# or TRDY# signals.

Concurrently with setting the flags 72 in the targets 70, the master 60 sets its own flag 62. Once the flag 62 in the master 60 is set, the master 60 is ready to broadcast. Similarly, once the flag 72 in each target 70 is set, each target 70 is ready to receive an imminent burst-broadcast reception. Each target 70 waits for a write-type command on the C/BE bus where the command does not carry the address of the target 70. Thereafter, during every clock cycle, each target 70 reads the data that is on the AD bus into its write buffer 76, and thence into its transmit FIFO 78.

Figure 5:
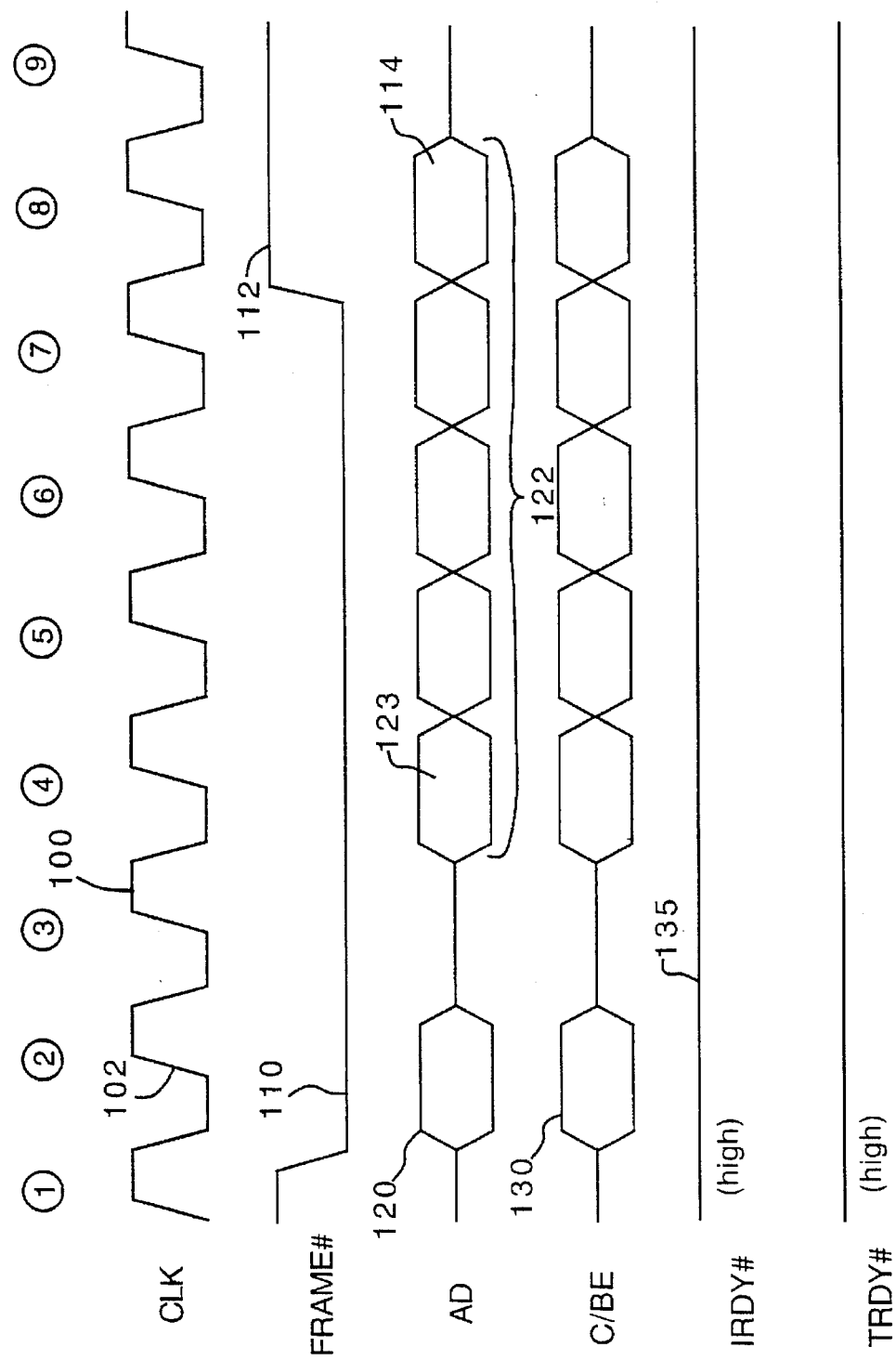
FIG. 5 is a timing diagram of a burst broadcast transaction in accordance with the preferred embodiment of the present invention.

A burst-broadcast is shown in the timing diagram of FIG. 5. A clock signal CLK 100 synchronizes the actions of the BIUs 55. The master BIU 60 and the target BIUs 70 sample the status of the input lines on the rising edge 102 of the CLK signal 100. The system begins at clock #1 with all status lines deasserted, and no data on the AD or C/BE bus.

Once the master 60 has completed the PCI Special Cycle to set the flag 72 in each target 70, the master 60 asserts the a FRAME# signal 110 before clock edge #2. The FRAME# signal 110 indicates the start and duration of the broadcast transaction. The master 60 ceases asserting the FRAME# signal 110 to indicate that it is transmitting its final data phase. For example, if the FRAME# signal 110 is deasserted at clock #8, each target 70 will know that the data at time 114 is the last data phase.

At the start of the burst-broadcast, in the address phase of clock #2, the master 60 outputs its own address 120 on the AD bus, in the preferred embodiment. The master 60 also asserts the DEVSEL# signal to ensure that the PCI bridges do not pass data onto other tiers. By placing its own address on the AD bus, the master 60 avoids contention because no other target 70 will assert the DEVSEL# signal. (However, the master 60 could also place an unused address on the AD bus with the same result). Simultaneously, the master 60 outputs a write-type command 130 on the C/BE bus. The write-type command 130, such as the PCI standard write command "0111" (binary) or I/O write command "0110" (binary), instructs all waiting targets 70 to begin accepting data from the AD bus.

In normal PCI-compliant operation, the IRDY# signal is driven low (asserted) to indicate that the master 60 is driving data onto the AD bus (during a write) or is ready to accept data from the AD bus (during a read). However, in the burst-broadcast mode, the master 60 drives the IRDY# signal 135 high (deasserted) to indicate that the operation is a burst-broadcast transaction sequence.

Similarly, in normal PCI-compliant operation, a target 70 drives the TRDY# low (asserted) to indicate that the target 70 is ready to accept data from the AD bus (during a write) or is driving data onto the AD bus (during a read). However, in the burst-broadcast mode, the targets 70 do not assert the TRDY# signal and the TRDY# signal remains driven high. Because the targets 70 do not assert the TRDY# signal, the master 60 assumes that the data has been correctly received. In fact, during the burst-broadcast operation, the master 60 will not respond to either of the TRDY# or STOP# signals in the preferred embodiment, nor will the targets 70 assert either the TRDY# or STOP# signals.

In the preferred embodiment, following the address phase at clock #2, the master 60 may begin at clock #4 (or some other designated clock) to drive data onto the AD bus. The master 60 transfers successive data words from its FIFO unit 69 into a write register 67, and thence onto the PCI bus 50. The master 60 sends a burst 122 of data (that is, a string of words 123 in successive data phases without any intervening pause) to the AD bus. At each successive clock, a new word 123 is placed on the AD bus. At each clock, each target 70 loads a word 123 from the AD bus into its write register 76, and thence into a transmit FIFO unit 78. It should be noted that these write operations are not messages as part of a PCI Special Cycle, but normal PCI write cycles.

In the preferred embodiment, a set number of words 123 is transmitted in each burst 122. Since the master 60 does not respond to the TRDY# or STOP# signals, it is the responsibility of the master 60 to ensure that the transmit FIFO units 78 are not overwritten. Specifically, the master 60 sends the exact number of words to match the depth of the FIFO units 78. Thus, the size of a broadcast is limited only by the available depth of the FIFO units 78 in the targets 70. (Because the FIFO units 78 are dual-ported, the "available" depth may be greater than the physical depth because data is removed from one "end" of the FIFO units 78 while data is being stored in the other "end" of the FIFO units 78).

In the preferred embodiment, the depth of a FIFO unit 78 is 128 words, but it may have a greater or lesser storage capacity. If the master 60 has more data to broadcast, its state machine 64 causes the master 60 to pause for a predetermined amount of time to allow each target 70 to process the data, and then resumes another burst (if control of the bus has not been lost due to the delay, in which case the master 60 must recapture control of the bus). Once a burst-broadcast is started, the master 60 will continue to transfer data until the entire block of data is output.

The state machine 64 of each BIU 80 may include a latency timer. In the preferred embodiment, the latency timer is set at a predetermined value at the beginning of a transaction, and is decremented every 8 PCI bus clocks. In a normal PCI-compliant write operation, a master 60 must discontinue its transaction if the latency timer has expired and the bus arbiter has reasserted the GNT# signal to revoke the grant of bus control. In contrast, in order to transmit a burst 122, in the preferred embodiment, the master 60 may ignore the internal latency timer signal to retain control of the PCI bus 50. This is acceptable because all of the BIUs 80 on a tier 40 are acting in concert. However, this is not necessarily true for a PCI to PCI bridge 37. In an alternate embodiment, in a burst-broadcast transaction the master 60 may use a latency timer with a much larger initial value, so that the master 60 has more data phases to complete a burst-broadcast.

Once the master 60 has transmitted all its data and the burst-broadcast transaction is complete, the master 60 executes another PCI Special Cycle to reset the flags 72 in the targets 70 and concurrently reset its own flag 62. The master 60 may reset its own flag 62 by responding to the PCI Special Cycle executed by the master 60, or directly by means of other internal circuitry. Resetting the target flags 72 is carried out in a manner nearly identically to the earlier PCI Special Cycle to set each flag 72, but the message contains an instruction to reset each flag 72. For example, a reset message could be indicated by the code "0000" (hex) in the upper half of the A/D bus.

It is possible that the master 60 will lose control of the PCI bus 50 after the target flags 72 have been set, due to re-arbitration for the bus. However, in any BIU 80, once its flag 82 is set, only burst-broadcast transactions are allowed. The BIUs 80, whether the master 60 or the targets 70, will respond to any write access (that is, a write transaction in which the BIU 80 is addressed) by issuing a retry command. In the preferred embodiment, if the flag 82 of a BIU 80 is set, the IRDY# signal is asserted low, and the BIU 80 is addressed by a write command, then the BIU 80 asserts the STOP# signal. The combination of an asserted STOP# with an deasserted TRDY# is a retry signal, which causes the current master 60 to cease its transaction. Arbitration will be forced again and again until the BIU 80 that has a burst-broadcast transaction to perform wins control of the PCI bus 50 and continues with its burst. Each BIU 80 may respond to single data phase read commands normally.

The invention thus provides a mechanism by which a communication system or an electronic device can efficiently broadcast messages to peer networks that are attached to a common PCI system, and also allows sharing of a semaphore flag among several devices. The coherency flag is used to synchronize as well as to prepare the devices for imminent broadcast reception. In addition, the invention inherently provides for resolution of priority among devices. That is, if several peer devices want to broadcast at the same time, the peer device that first sets the flags can perform the broadcast, and the other peer devices must wait their turn, as determined by a system arbitration unit. In any case, requests are never discarded, and the flag management allows the winner of the system arbitration to do the broadcast next.

A consequence of this invention is that this mechanism provides equitable sharing of bandwidth among network-peers resident on one bus tier to do burst broadcasts from any one peer to the rest of the peers. For example, several independent networks sharing a common data bus (PCI or similar) as their backbone can communicate among themselves. The conventional PCI protocol allows a bus master device to perform one-to-one burst transfers as the common mechanism of communication. The present invention extends the PCI protocol by providing a mechanism to allow communication from a bus master BIU to all other BIU devices on the same tier. For example, if a network is to become unavailable for a period of time due to repairs, it can use a burst-broadcast transaction to send a lengthy broadcast message to all other peer devices before the repair occurs. Another message could be used for synchronization purposes where all networks are alerted for an expected eventuality.

Using the invention, all participants (peers) on a network or bus system have an equal opportunity to attain bus mastership (assuming the bus arbiter is configured to do so) in order to perform a burst broadcast. However, the semaphore coherency flag mechanism manages which device can perform the broadcast (that is, the device which sets all of the flags is allowed to burst data to the other devices). If all devices want to broadcast at the same time, the order of access is determined by the bus arbiter in conjunction with the semaphore management mechanism. If an order of priority is required, the bus arbiter can be configured differently. The bus arbiter configuration varies from system to system and is dependent on user preference.

A number of embodiments of the present invention have been described. Nevertheless, it will be understood that various modifications may be made without departing from the spirit and scope of the invention. For example, although the present invention has been illustrated in the context of a PCI bus, the same concept works with any bus that lacks a burst broadcast transaction mode but does permit setting multiple flags via a broadcast special cycle command. Accordingly, it is to be understood that the invention is not to be limited by the specific illustrated embodiment, but only by the scope of the appended claims.

What is claimed is:

1. In a network having a plurality of devices connected to a bus, the bus having a transaction protocol that lacks a burst broadcast data transmission mode but does have a broadcast command cycle, the transaction protocol including at least one data phase, a method of transmitting data from an initiator device simultaneously to a plurality of other devices, comprising the steps of:

(i) capturing control of the bus with the initiator device;
   (ii) setting a flag in each of the plurality of other devices by means of a broadcast command cycle to indicate commencement of a burst broadcast transaction and concurrently setting a flag in the initiator device to complete preparation for a burst broadcast transaction;
   (iii) burst broadcasting data on the bus from the initiator device to each of the plurality of other devices simultaneously, wherein the burst broadcast of data can extend over a plurality of data phases; and
   (iv) resetting the flag in each of the other devices by means of a broadcast command cycle, and concurrently resetting the flag in the initiator device to indicate termination of the burst broadcast transaction.

2. In a network having a plurality of devices connected to a bus, a method of transmitting data from an initiator device to a plurality of other devices connected to the bus, the bus having a transaction protocol including at least one data phase, the method comprising the steps of:

(i) capturing control of the bus with the initiator device;
   (ii) concurrently setting a coherency flag in each of the plurality of other devices and in the initiator device;
   (iii) burst broadcasting data on the bus from the initiator device to each of the plurality of other devices simultaneously, wherein the broadcast of data can extend over a plurality of data phases; and
   (iv) concurrently resetting the coherency flag in the initiator device and in each of the plurality of other devices.

3. The method of claim 2, wherein the step of burst broadcasting includes the further step of broadcasting a predefined amount of data.

4. The method of claim 2, wherein the bus comprises a peripheral component interconnect (PCI) bus.

5. The method of claim 4, wherein the flag of each of the other devices is set with a PCI Special Cycle command.

6. The method of claim 2, wherein the step of burst broadcasting the data includes the further steps of transferring an address from the initiator device to the bus in an address phase, and transferring data from the initiator device to the bus in a plurality of successive data phases.

7. In a network having a plurality of devices connected to a peripheral component interconnect (PCI) bus, a method of transmitting data from an initiator device to a plurality of other devices, comprising:

(i) capturing control of the PCI bus with the initiator device;
   (ii) concurrently setting a flag in each of the plurality of other devices with a PCI Special Cycle command, and in the initiator device;
   (iii) burst broadcasting data on the PCI bus over at least one data phase from the initiator device to each of the plurality of other devices simultaneously; and
   (iv) concurrently resetting the flag in each of the plurality of other devices with a PCI Special Cycle command, and in the initiator device.

8. A bus interface unit (BIU) for connecting a device to a PCI bus, comprising:

(i) means for capturing control of the PCI bus if the BIU has a burst-broadcast transaction;
   (ii) a flag;
   (iii) means for transmitting and receiving a first message and a second message on the PCI bus;
   (iv) means for setting the flag:
      (1) if the BIU captures control of the PCI bus and the flag is not set, or
      (2) if the BIU receives the first message;
   (v) means for transmitting a burst-broadcast transaction to a plurality of other devices connected to the PCI bus simultaneously if the flag is set, the burst broadcast extending over at least one data phase of the PCI bus;
   (vi) means for receiving a burst-broadcast transaction on the PCI bus if the flag is set; and
   (vii) means for resetting the flag:
      (1) if the BIU completes the burst-broadcast transaction, or
      (2) if the BIU receives the second message.

9. In a network having a plurality of devices connected to a bus, the bus having a transaction protocol that lacks a burst broadcast data transmission mode but does have a broadcast command cycle, the transaction protocol including at least one data phase, a bus interface device for transmitting data simultaneously to a plurality of other devices, the bus interface device comprising:

(i) means for capturing control of the bus;
   (ii) means for setting a flag in each of the plurality of other devices by means of a broadcast command cycle to indicate commencement of a burst broadcast transaction, and for concurrently setting an internal flag to complete preparation for a burst broadcast transaction;
   (iii) means for transmitting burst broadcast data on the bus to each of the plurality of other devices simultaneously, wherein the burst broadcast can extend over a plurality of data phases; and
   (iv) means for resetting the flag in each of the other devices by means of a broadcast command cycle, and for concurrently resetting its internal flag to indicate termination of the burst broadcast transaction.

10. In a network having a plurality of devices connected to a bus, the bus having a transaction protocol that lacks a burst broadcast data transmission mode but does have a broadcast command cycle, the transaction protocol including at least one data phase, a bus interface device for receiving data from a master device transmitting simultaneously to a plurality of bus interface devices, each bus interface device comprising:

(i) means for setting a flag in response to receipt of a broadcast command cycle from the master device indicating commencement of a burst broadcast transaction;

(ii) means for receiving burst broadcast data on the bus from the master device simultaneously with all other bus interface devices connected to the bus, such that the burst broadcast can extend over a plurality of data phases; and (iii) means for resetting the flag in response to receipt of a broadcast command cycle from the master device indicating termination of the burst broadcast transaction.

* * * * *